United States Patent
Schmidt

(10) Patent No.: US 7,147,458 B2
(45) Date of Patent: Dec. 12, 2006

(54) APPARATUS FOR HEATING INJECTION MOLDING FLUID

(75) Inventor: Harald Hans Schmidt, Georgetown (CA)

(73) Assignee: Mold Hotrunner Solutions, Inc., Ontario (CA)

( * ) Notice: Subject to any disclaimer, the term of this patent is extended or adjusted under 35 U.S.C. 154(b) by 139 days.

(21) Appl. No.: 10/693,796

(22) Filed: Oct. 24, 2003

(65) Prior Publication Data

US 2004/0241277 A1    Dec. 2, 2004

(30) Foreign Application Priority Data

Oct. 25, 2002    (CA) .................................... 2409785

(51) Int. Cl.
    *B29C 45/72*    (2006.01)
(52) U.S. Cl. ..................... 425/549; 138/89; 392/482
(58) Field of Classification Search ............. 425/549; 392/482; 138/89
    See application file for complete search history.

(56) References Cited

U.S. PATENT DOCUMENTS

| 3,535,742 A | 10/1970 | Marcus |
| 3,780,764 A | 12/1973 | Geist |
| 3,820,928 A | 6/1974 | Lemelson |
| 3,861,841 A | 1/1975 | Hanning |
| 3,952,927 A | 4/1976 | Schaumburg et al. |
| 4,204,906 A | 5/1980 | Liu |
| 4,389,002 A | 6/1983 | Devellian et al. |
| 4,500,279 A | 2/1985 | Devellian et al. |
| 4,521,179 A | 6/1985 | Gellert |
| 4,588,367 A | 5/1986 | Schad |
| 4,592,711 A | 6/1986 | Capy |
| 4,701,292 A | 10/1987 | Valyi |
| 4,747,770 A | 5/1988 | Schmidt |
| 4,755,131 A | 7/1988 | Schmidt |
| 4,768,945 A | 9/1988 | Schmidt et al. |
| 4,793,795 A | 12/1988 | Schmidt et al. |
| 4,863,369 A | 9/1989 | Schad et al. |
| 4,931,234 A | 6/1990 | Schad et al. |
| 4,932,854 A | 6/1990 | Matsuda et al. |
| 5,007,821 A | 4/1991 | Schmidt |
| 5,009,718 A | 4/1991 | Schmidt |
| 5,078,589 A | 1/1992 | Osuna-Diaz |
| 5,141,696 A | 8/1992 | Osuna-Diaz |
| 5,149,547 A | 9/1992 | Gill |
| 5,192,555 A | 3/1993 | Arnott |
| 5,225,662 A | 7/1993 | Schmidt |
| 5,281,374 A | 1/1994 | Matsuda et al. |
| 5,288,222 A | 2/1994 | Wieser |

(Continued)

*Primary Examiner*—Tim Heitbrink
(74) *Attorney, Agent, or Firm*—Gifford, Krass, Groh, Sprinkle, Anderson & Citkowski, P.C.

(57) ABSTRACT

A heater assembly is described for mounting around a fluid flow channel in an injection molding apparatus. In one version, the heater assembly comprises: an inner tube made of a first heat conductive material having a first coefficient of thermal expansion, the inner tube having a selected longitudinal length, an inner surface, an outer surface; and a first ring having an inner surface engaged around the outer surface of the inner tube along a short selected length of the longitudinal length of the inner tube. The ring comprises a second material having a second coefficient of thermal expansion that is less than the first coefficient of thermal expansion. The assembly also has a heater mechanism that heats the inner tube to a selected elevated temperature. Alternatively, the ring can be made from a shape memory alloy that causes the ring to reduce in diameter when the ring is heated above a threshold temperature.

18 Claims, 5 Drawing Sheets

U.S. PATENT DOCUMENTS

| | | |
|---|---|---|
| 5,356,576 A | 10/1994 | Fischbach |
| 5,360,333 A * | 11/1994 | Schmidt .................... 425/549 |
| 5,378,139 A | 1/1995 | Schad et al. |
| 5,389,315 A | 2/1995 | Yabushita |
| 5,492,467 A | 2/1996 | Hume et al. |
| 5,545,028 A | 8/1996 | Hume et al. |
| 5,554,395 A | 9/1996 | Hume et al. |
| 5,556,582 A | 9/1996 | Kazmer |
| 5,591,366 A | 1/1997 | Schmidt et al. |
| 5,601,773 A | 2/1997 | Schmidt et al. |
| 5,674,439 A | 10/1997 | Hume et al. |
| 5,871,786 A | 2/1999 | Hume et al. |
| 5,885,624 A | 3/1999 | Katsuta et al. |
| 5,885,628 A | 3/1999 | Swenson et al. |
| 5,894,025 A | 4/1999 | Lee et al. |
| 5,916,605 A | 6/1999 | Swenson et al. |
| 5,930,458 A * | 7/1999 | Yane et al. ................ 392/482 |
| 5,948,448 A | 9/1999 | Schmidt |
| 5,948,450 A | 9/1999 | Swenson et al. |
| 5,954,094 A * | 9/1999 | Base .......................... 138/89 |
| 5,980,237 A | 11/1999 | Swenson et al. |
| 6,000,831 A | 12/1999 | Triplett |
| 6,027,328 A | 2/2000 | Herbst |
| 6,062,840 A | 5/2000 | Lee et al. |
| 6,254,377 B1 | 7/2001 | Kazmer et al. |
| 6,261,075 B1 | 7/2001 | Lee et al. |
| 6,261,084 B1 | 7/2001 | Schmidt |
| 6,287,107 B1 | 9/2001 | Kazmer et al. |
| 6,294,122 B1 | 9/2001 | Moss et al. |
| 6,309,208 B1 | 10/2001 | Kazmer et al. |
| 6,343,921 B1 | 2/2002 | Kazmer et al. |
| 6,343,922 B1 | 2/2002 | Kazmer et al. |
| 6,361,300 B1 | 3/2002 | Kazmer |
| 6,419,870 B1 | 7/2002 | Lee et al. |
| 6,436,320 B1 | 8/2002 | Kazmer et al. |
| 6,683,283 B1 | 1/2004 | Schmidt |

* cited by examiner

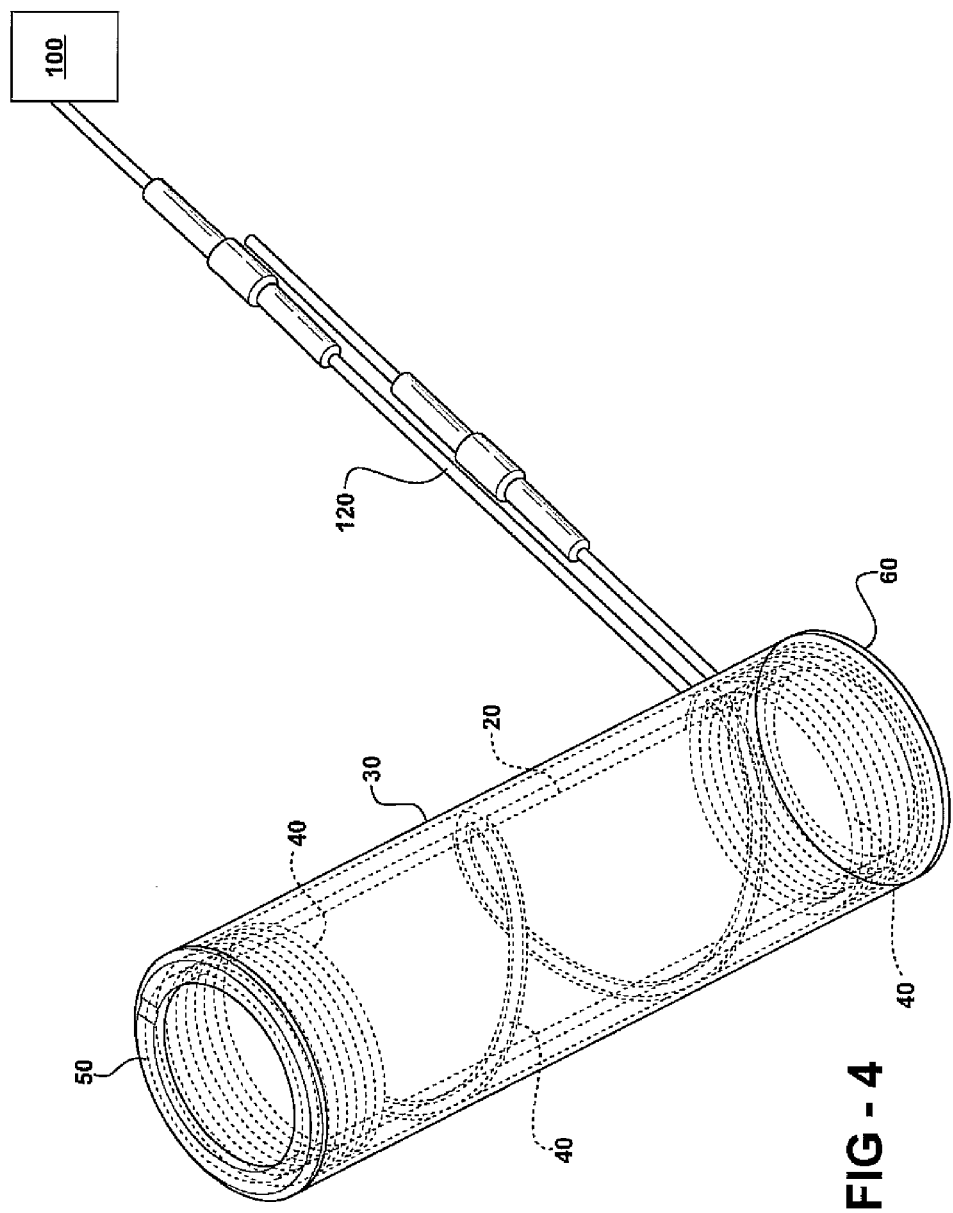

APPARATUS FOR HEATING INJECTION MOLDING FLUID

BACKGROUND OF THE INVENTION

This invention relates to a heater for an injection molding nozzle.

Injection molding processes and apparatus typically involve heating materials which are solid at room temperature to elevated temperatures where the solid materials are converted to a fluid capable of flowing readily through tubes, barrels, bores and channels of various shapes and sizes that direct the fluid to the cavity of a mold where the fluid is cooled and formed into a solid part. Heating of the fluid flow channels in injection molding machine apparatus and processes has been attempted in a variety of configurations and devices that have been designed to achieve the most efficient contact possible between a source of heat and the paths/channels through which the fluid is routed. In order to maintain injected fluid at an elevated temperature, various heating devices such as wires, coils, tubes and the like are placed in direct contact/engagement with the housings of the apparatus. Such heating devices/methods rely on conduction of heat throughout the body or matrix of the components to travel to the walls of the fluid flow channels.

SUMMARY OF THE INVENTION

The invention relates to heating of a fluid flow channel in an injection molding apparatus, and more particularly, to an apparatus for ensuring intimate contact between the heating device and the body of the apparatus or system component that is sought to be heated to an elevated temperature.

In accordance with one aspect of the invention, there is provided a heater assembly for mounting around a fluid flow channel in an injection molding apparatus, the heater assembly including an inner tube comprising a first heat conductive material having a first coefficient of thermal expansion, the inner tube having a selected longitudinal length, an inner surface and an outer surface. There is also provided a first ring having an inner surface engaged around the outer surface of the inner tube along short selected length of the longitudinal length of the inner tube, the first ring comprising a second material having a second coefficient of thermal expansion that is less than the first coefficient of thermal expansion. The assembly has a heater mechanism that heats the inner tube to a selected elevated temperature.

The heater assembly may include an outer tube receiving and mounted around the outer surface of the inner tube, the first ring mounting the outer tube in a fixed position around the outer surface of the inner tube, the outer tube being mounted such that an inner surface of the outer tube is spaced a distance from the outer surface of the inner tube. The heater mechanism is typically mounted within the space between the inner ring and the outer ring.

The assembly preferably includes a second ring having an inner surface engaged around the outer surface of the inner tube along a second short selected length of the longitudinal length of the inner tube, the second ring comprising a material having a coefficient of thermal expansion that is less than the first coefficient of thermal expansion. The second ring mounts the outer tube in the fixed position around the outer surface of the inner tube in cooperation with the first ring.

The first ring and the second ring typically have the same or substantially the same coefficient of thermal expansion.

The short selected length typically extends from a first terminal end of the inner tube, the first ring being mounted at and around the first terminal end of the inner tube. The second short selected length typically extends from a second terminal end fo the inner tube, the second ring being mounted at and around the second terminal end of the inner tube.

The inner tube and the first ring expand radially upon heating to selected elevated temperatures, the second material of the first and second rings being selected such that the first and second rings expand less rapidly than the inner tube expands radially upon said heating, the first and second rings restricting radial expansion upon said heating.

The inner tube preferably includes a slot extending the longitudinal length of the inner tube.

The outer tube receives and is mounted around the outer surface of the inner tube by the first and second rings such that an inner surface of the outer tube is spaced a selected distance from the inner surface of the inner tube, an enclosed space being formed between the first and second rings and between the inner surface of the outer ring and the outer surface of the inner ring.

The heater mechanism is preferably mounted in the enclosed space in engagement with the outer surface of the inner tube and being spaced a distance from the inner surface of the outer tube.

The heater mechanism typically comprises an electrically conductive material of high resistance connected to a source of electrical energy for controllably heating the material by controlled application of electrical energy to the material.

Further in accordance with another aspect of the invention there is provided a heater assembly for mounting around a fluid flow channel in an injection molding apparatus, the heater assembly including a tube comprising a first heat conductive material and having a selected longitudinal length, an inner surface and an outer surface. There is also provided a first ring having an inner surface engaged around the outer surface of the tube along a short selected length of the longitudinal length of the tube and a second ring having an inner surface engaged around the outer surface of the tube along a second short selected length of the longitudinal length of the inner tube. The assembly includes a heater mechanism mounted around and in engagement with the outer surface of the tube.

According to a further aspect of the invention, there is provided a heater assembly for mounting around a fluid flow channel in an injection molding apparatus, the heater assembly includes a tube comprising a heat conductive material, the tube having a selected longitudinal length, an inner surface and an outer surface. There is a ring having an inner surface engaged around the outer surface of the tube along a short selected length of the longitudinal length of the tube, the ring being made from a shape memory alloy that causes the ring to reduce in diameter when the ring is heated above a threshold temperature so as to positively clamp the inner tube on a portion of the injection molding apparatus forming the fluid flow channel during use of the heater assembly. The heater assembly also includes a heater mechanism capable of heating the tube to a selected elevated temperature.

Further features and advantages will become apparent from the following detailed description taken in conjunction with the accompanying drawings.

BRIEF DESCRIPTION OF THE DRAWINGS

FIG. 4 is a transparent, perspective view of the FIG. 1 apparatus;

DETAILED DESCRIPTION OF PREFERRED EMBODIMENTS

Figure 1:
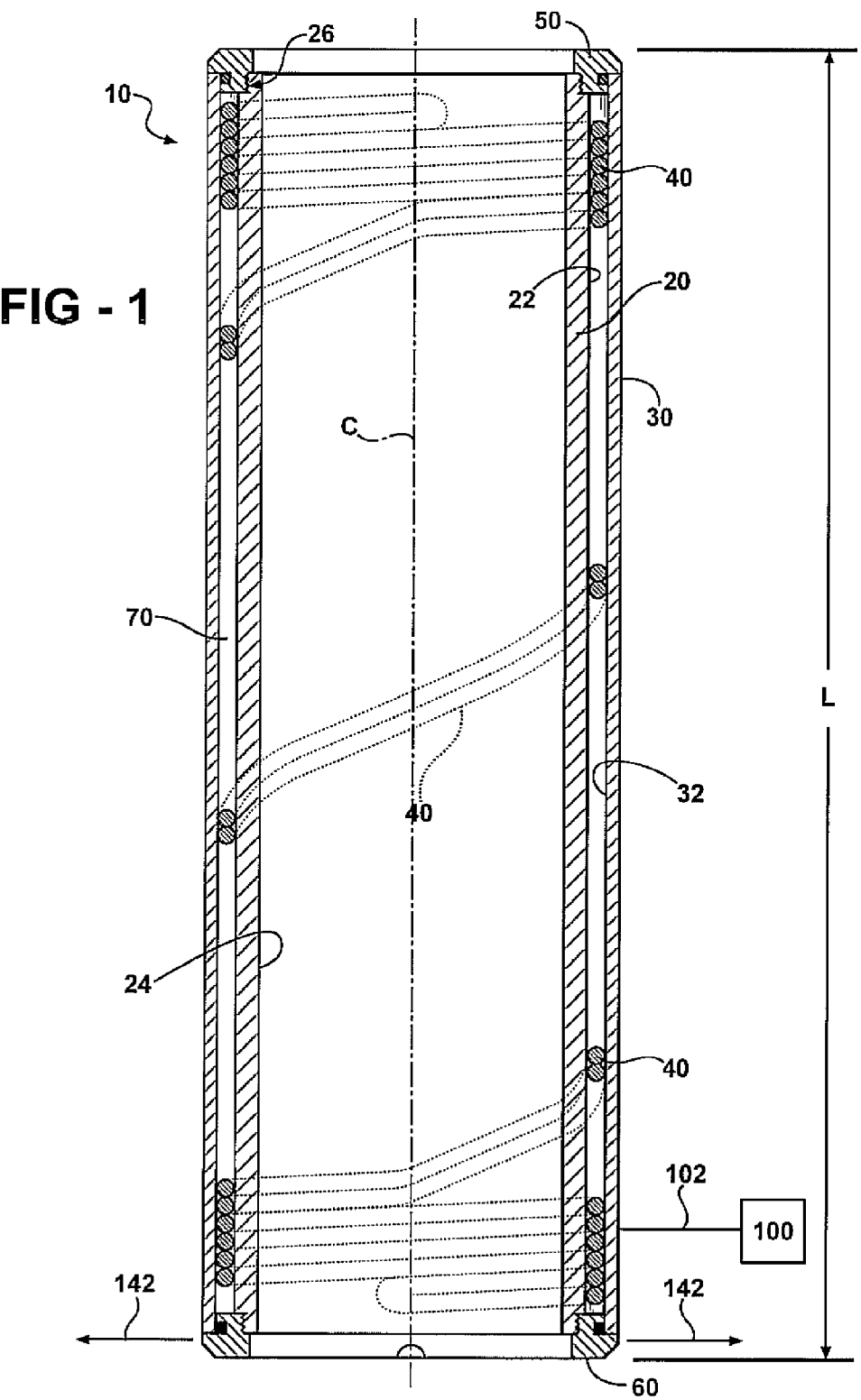
FIG. 1 is a side cross-sectional view of a heater apparatus according to the invention.

FIG. 1 shows a heater apparatus 10 according to one aspect of the invention. The heater apparatus 10 comprises an inner tube 20 and an outer tube 30. The inner tube 20 is typically comprised of a material having a relatively high coefficient of thermal expansion such as copper, aluminum, and alloys therewith. The outer tube 30 is typically comprised of a heat reflective material such as polished aluminum alloys. The materials comprising both tubes 20, 30 are preferably resistant to oxidation and corrosion, typically anodized aluminum. As shown, the inner 20 and the outer 30 tubes are mounted at opposing terminal ends by rings 50, 60 in spaced relationship whereby an enclosed annular space 70 is formed between the inner surface 32 of the outer tube 30 and the outer surface 22 of the inner tube 20.

The heater coils 40 are enclosed within the space 70 and are preferably mounted in contact engagement with the outer surface 22 of the inner tube 20 so as to most efficiently transmit heat energy to the body of the heat conductive material of which tube 20 is comprised. Heater coils 40 are connected by conventional electrical wiring 102 to a source of heat generating energy 100 such as an electrical voltage or current generator which can be readily controlled to transmit electrical energy to coils 40 and raise the temperature of the coils 40 to one or more preselected temperatures. Other sources of heat generation may alternatively be employed such as a fluid material which is controllably heated at a source and routed through tubes 40. The heater mechanism may alternatively be constructed in other formats such as heatable sheets or strips akin to coils 40 which wrap around the outer surface 22 of the inner tube 20. Alternatively, the heater may comprise thick or thin film electrical resistance elements encased in enamel.

Figure 5:
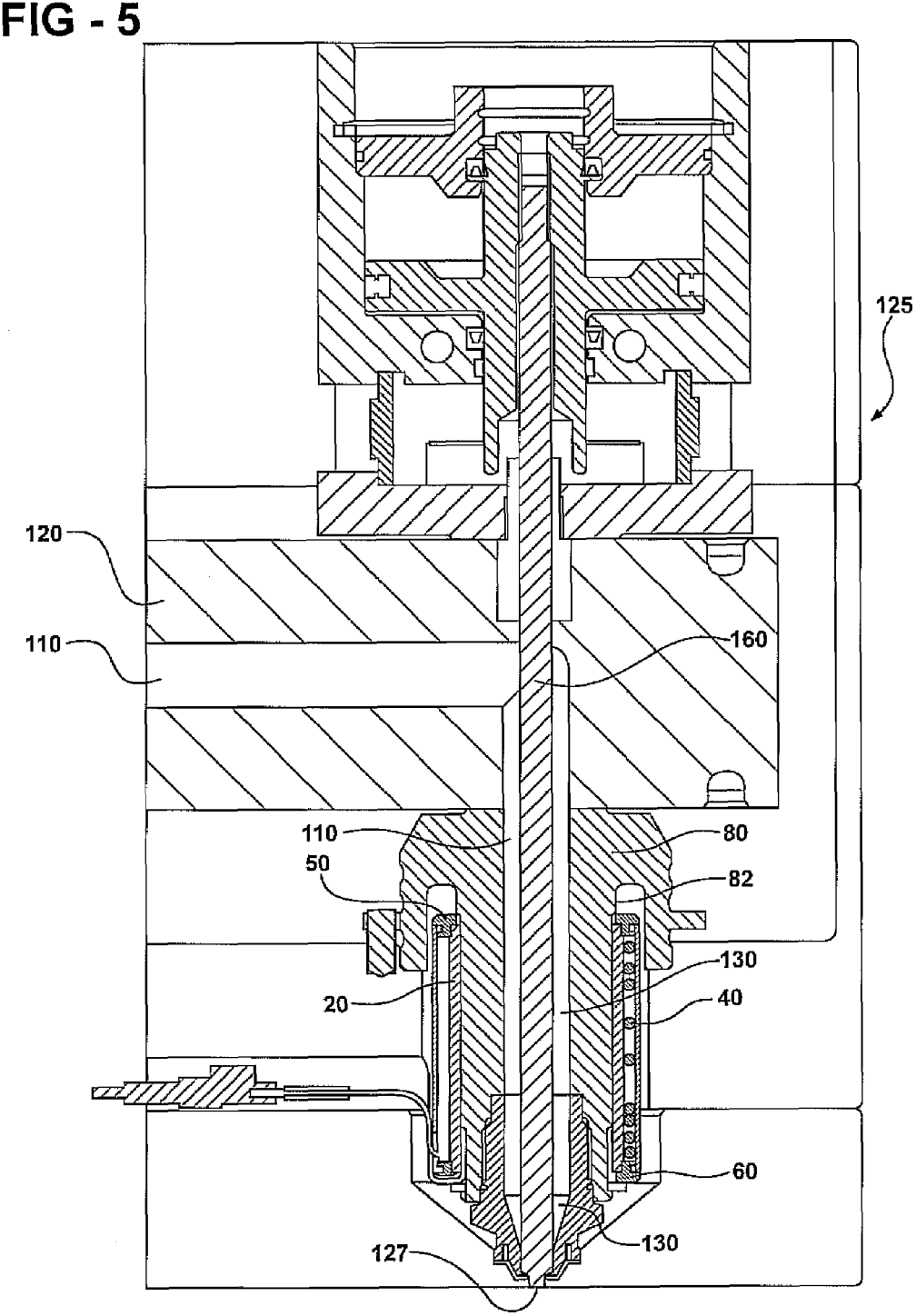
FIG. 5 is a schematic, side cross-sectional view of a portion of an injection molding apparatus showing a heater apparatus arranged/fitted around the downstream nozzle end of a fluid flow channel, where the nozzle has a controllably movable valve pin.

As shown in FIG. 5, the inner surface 24 of inner tube 20 is fitted around the outer surface 82 of a nozzle body 80 that is mounted at an upstream end to sealably communicate with a fluid flow channel 110 of a heated fluid distribution manifold or hotrunner 120. The diameter A of inner tube 20 is typically configured to be essentially the same as or only very slightly larger at room temperature than the outer surface diameter of the nozzle body 80 such that nozzle body 80 is snugly received within the hollow interior of heater tube 20. The manifold 120 of the injection molding apparatus 125 is heated to an elevated temperature to maintain the fluid injected into the channel 110 in a readily fluid flow state. The heater assembly in the arrangement shown in FIG. 5 is positioned at a downstream position around the nozzle body 80 to continue to maintain the fluid at a selected elevated temperature as the fluid travels from channel 110 through the channel or bore 130 of nozzle 80. The heater coils 40 heat inner tube 20 which in turn heats nozzle body 80 which in turn heats fluid within channel 130.

Figure 2:
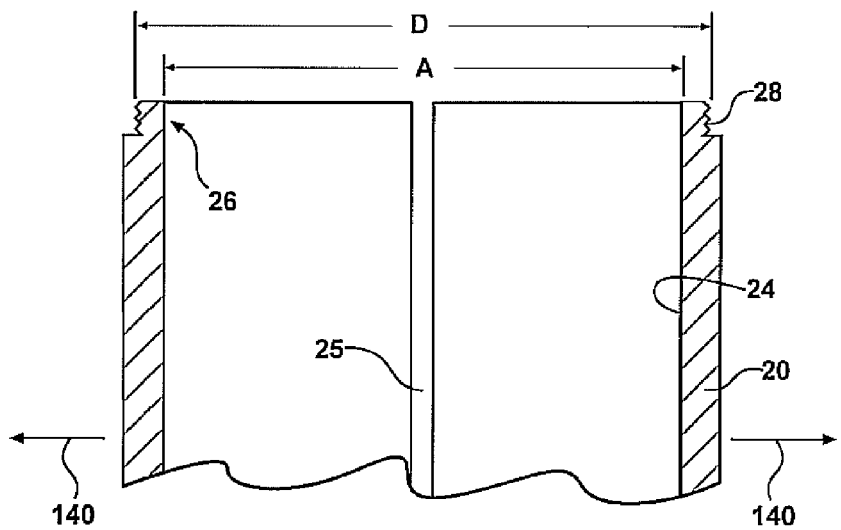
FIG. 2 is a side cross-sectional view of part of the inner tube component of the FIG. 1 apparatus.
Figure 3:
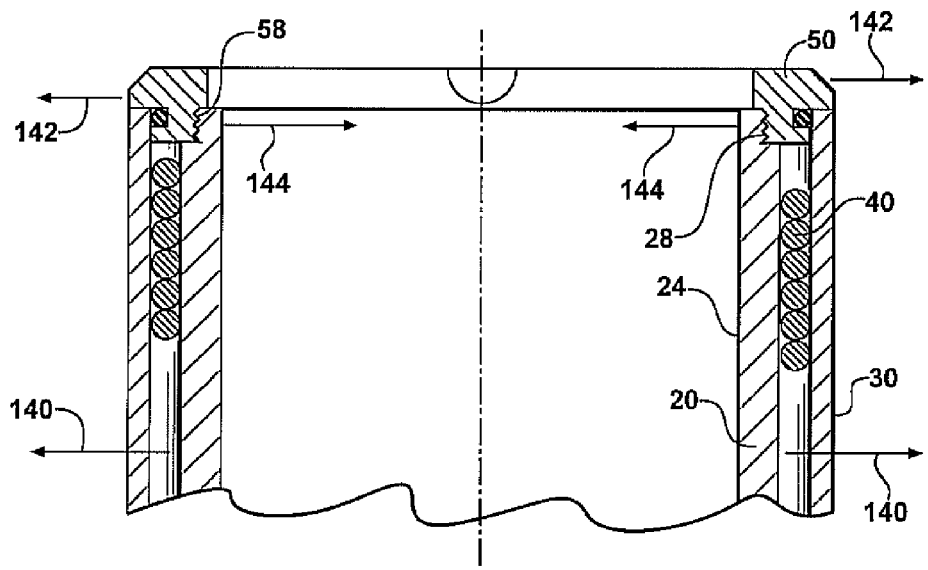
FIG. 3 is a close-up view of the upper end of the FIG. 1 apparatus showing the arrangement and fitting together of the inner and outer tube components relative to an end cap or ring component.
Figure 3A:
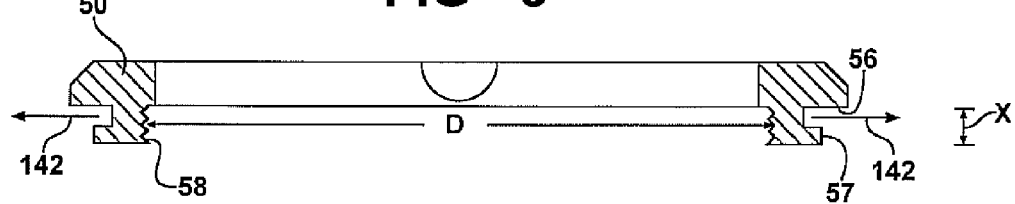
FIG. 3a is a side schematic cross-sectional view of the ring element of the FIG. 1 apparatus.

The inner heater tube 20 is comprised of a material, typically highly heat conductive metal such as steel, stainless steel, aluminum or other suitable metal material, that expands radially as indicated by arrow 140 in FIGS. 2, 3 upon heating to elevated temperature. The rings 50, 60 also expand radially as indicated by arrow 142 in FIGS. 1, 3 upon heating to an elevated temperature. However, the rings 50, 60 are comprised of a relatively low thermally expansive metal material, such as titanium, steel, stainless steel or other suitable metal, which has a coefficient of thermal expansion which is less than the coefficient of thermal expansion of the metal material of which the inner tube 20 is comprised. The rings 50, 60 thus restrain the higher radially expanding inner tube 20 by virtue of an inner circumferential surface 58 (FIGS. 3, 3a) of the rings being frictionally engaged around and against an opposing outer circumferential surface 28 (FIGS. 2, 3) of the inner tube 20. As shown in FIG. 2, the outer circumferential mounting surface 28 of inner tube 20 has a diameter D which is essentially the same or only very slightly smaller at room temperature than the inner circumferential diameter D (FIG. 3a) of the mating surface 58 (FIGS. 3, 3a) of the ring 50, 60. As seen in FIG. 3a, the ring 50 has an outer circumferential groove defining abutment and mounting surfaces 56, 57 for bearing against the outer tube 30. The ring 60 has similar abutment and mounting surfaces. Once assembled, the abutting terminal ends of the outer tube 30 are crimped into the outer circumferential grooves of the rings 50, 60 thereby defining a unitary body to contain the inner tube 20. Upon heating of the apparatus 10 (FIG. 1), the inner tube 20 radially expands as indicated by arrow 140 to a greater degree than the rings 50, 60 radially expand as indicated by arrow 142 and thus the pressure between surfaces 58 and 28 increases as the apparatus is heated creating a radially inward force indicated by arrow 144 by surface 58 against surface 28. The increased radially inward-pressure force 144 created by rings 50, 60 against surface 28 of the inner tube 20, in turn, causes increased pressure of the inner circumferential surface 24 of the tube 20 against the outer surface 82 (FIGS. 5, 7) of the nozzle body 80 thus increasing the heat conductive contact area and heat conductive efficiency between inner tube 20 and nozzle body 80. The rings 50, 60 thus act to clamp the inner tube 20 against the outer surface of the nozzle 80 upon heating of the apparatus 10, 125 to operating temperatures.

The inner tube 20 is typically provided with a slot 25 (FIG. 2) through the entire body length of tube 20 which allows the tube body 20 to more easily contract in circumference under the inward pressure force 144 being exerted on the outer circumferential surface of the tube 20 by rings 50, 60. As shown the slot 25 is parallel to the axis C of the tube 30 (FIGS. 1, 2). The slot 25 may alternatively be slanted at an angle relative to axis C or curved, curvilinear, zig-zag or arranged in some other pattern relative to axis C other than the straight, parallel arrangement shown in FIG. 2.

As shown in FIGS. 1 to 6, the rings are mounted at the terminal opposing ends of the inner tube 20. The longitudinal length X (FIG. 3a) of the inner circumferential engagement surfaces 58 of the rings 50, 60 is very short or foreshortened relative to the overall longitudinal length L (FIG. 1), of the inner 20 and outer 30 tubes. Typically, the longitudinal engagement length X (FIG. 3a) is less than about 10% of the total longitudinal length L of tube 20, and preferably less than about 5% and most preferably less than about 3%.

Figure 6:
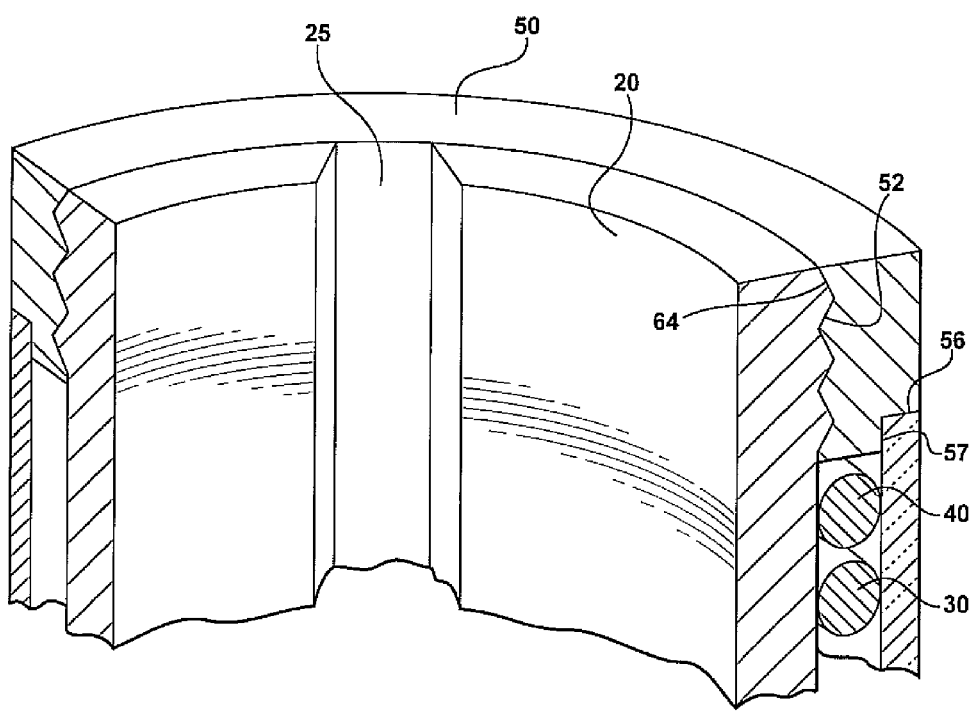
FIG. 6 is a schematic sectional view of an alternative embodiment of the invention showing a ring element coupled to an inner tube with complementary screw threads.

In the embodiment of the invention shown in FIG. 6, the inner engagement surface 58 of the rings 50, 60 may include screw threads or teeth 52 which are complementary with screw threads or teeth 64 provided on the outer mounting surface 28 of the heater tube 20 such that the rings 50, 60 may simply be screwed onto the top and bottom terminal ends of the tube 20. In such an arrangement, one screwably engageable ring 50 or 60 can be first screwed onto an end of the tube 20, then the outer tube 30 can be slid over the outside of tube 20 and one end of the outer tube 30 positioned against the abutment, mounted surfaces 56, 57 (FIG. 3*a*), to assume the position of tube 30 shown in FIGS. 1, 3. After the outer tube is slid over the inner tube 20, the other of the rings can then be screwed onto the other end of the tube 20 and the other end of tube 30 positioned snuggly against mounting surfaces 56, 57 of the other of rings 50, 60 such that tube 30 is stationarily held in the position shown in FIGS. 1, 3 relative to inner tube 20.

Alternatively, the rings 50, 60 can be made from a shape memory alloy that reduces in diameter when heated above a threshold temperature so as to positively clamp the inner tube 20 on a portion of the injection molding apparatus forming a fluid channel.

The inner enclosed space 70 is created by the assembly and mounting of the larger inner diameter outer tube 30 around the smaller outer diameter tube 20. The mounting and clamping rings 50, 60 enclose the air space 70 off from the outside environment which creates a somewhat insulated air space that becomes elevated in temperature and insulated from cooling influences that may be conducted to the heated metal structures 120, 80 which are in conductive contact with the mold body which is being subsequently cooled relative to the nozzle 80 and manifold 120 during an injection cycle.

The inner enclosed space 70 is maintained as heat retentive reservoir, in part by the outer tube 30 which reflects and retainer heat within the space 70, by virtue of its inner surface 32 being spaced a certain radial distance away from both the heater coil elements 40 and the outer surface 22 of the inner tube 20. The outer tube 30 is typically comprised of a heat reflective metal material such as steel or stainless steel or anodized aluminum.

The rings 50, 60 are shown as being mountable/screwable onto the two opposing terminal ends of the tube 20. Alternatively the rings 50, 60 can be mounted, attached, screwed or otherwise connected to the outer surface of the tube 20 at any position along the longitudinal length of the tube 20.

The tubes 20, 30 and the rings 50, 60 are shown in the figures in cylindrical design/configuration. The tubes and rings can have a variety of shapes in radial section such as square, oval, hexagonal, pentagonal or any other tubular shape that matches or is complementary to the outer circumference of the fluid flow channel structure that the heater assembly is intended to be mounted around. Also, as shown in FIG. 5, the heater assembly is mounted around the more downstream end of the fluid flow channel, ie around the nozzle 80, which is immediately upstream of the gate for the mold into which the fluid plastic is injected and eventually cooled during an injection cycle into a molded part. The heater assembly 10 can alternatively be mounted around any portion of any fluid flow channel in the system, eg. around the hotrunner channel 110 or another fluid flow channel section that is configured to allow a tubular heater construction to be mounted around. Such a heater assembly can, for example, be mounted around the barrel (not shown) of an injection molding machine itself or around the other nozzles that feed into other distribution channels or molds in a manifold or runner in the system.

FIG. 5 shows an exemplary embodiment of a heater assembly used in controllable fluid flow rate injection systems. In FIG. 5, the heater assembly is engaged around a nozzle 80 having a valve pin 160 which controls the fluid flow through the bore 130 depending on the positioning of the valve pin 160 relative to the opening of the channel 130 in the area of the gate 127.

It will be understood that several variations may be made to the above-described embodiments of the invention within the scope of the appended claims, as will be apparent to those skilled in the art. In particular, the nature of the materials will be selected in accordance with the intended application. It may also be understood that an outer tube is not required but that this may leave the heating mechanism exposed. The outer tube could be made from any desirable insulating material and even comprise a ceramic material.

I claim:

1. A heater assembly for mounting around a fluid flow channel in an injection molding apparatus, the heater assembly comprising:

an inner tube comprising a first heat conductive material having a first coefficient of thermal expansion, the inner tube having a selected longitudinal length, an inner surface, and an outer surface, said inner tube also having a slot extending through the length of the inner tube;

a first ring having an inner surface engaged around the outer surface of the inner tube along a first selected length which is less than about 10 percent of the longitudinal length of the inner tube, the first ring comprising a second material having a second coefficient of thermal expansion that is less than the first coefficient of thermal expansion;

a second ring having an inner surface engaged with the outer surface of the inner tube along a second selected length which is less than about 10 percent of the longitudinal length of the inner tube, the second ring also comprising the second material having the second coefficient of thermal expansion; and a heater mechanism mounted around the outer surface of the inner tube and capable of heating the inner tube to a selected elevated temperature.

2. A heater assembly of claim 1 further comprising an outer tube receiving and mounted around the outer surface of the inner tube, the first ring mounting the outer tube in a fixed position around the outer surface of the inner tube, the outer tube being mounted such that an inner surface of the outer tube is spaced a distance from the outer surface of the inner tube.

3. The heater assembly of claim 2 wherein the heater mechanism is mounted within the space between the inner tube and the outer tube.

4. The heater assembly of claim 3 wherein the second ring mounts the outer tube in the fixed position around the outer surface of the inner tube in cooperation with the first ring.

5. The heater assembly of claim 1 wherein the first selected length extends from a first terminal end of the inner tube, the first ring being mounted at and around the first terminal end of the inner tube.

6. The heater assembly of claim 1 wherein the inner tube and the first and second rings expand radially upon heating to select elevated temperatures, the second material of the first and second rings being selected such that the first and second rings expand less radially than the inner tube expands radially upon said heating, the first and second rings restricting radial expansion upon said heating.

7. The heater assembly of claim 2 wherein the heater mechanism is mounted in the space between the inner tube and the outer tube and is spaced a distance from the inner surface of the outer tube.

8. The heat assembly of claim 7 wherein the heater mechanism comprises an electrically conductive material of high resistance connected to a source of electrical energy for controllably heating the conductive material by controlled application of electrical energy to the conductive material.

9. The heater assembly of claim 1 in which the inner surface of the first ring has screw threads and the outer surface of the inner tube has screw threads on said first selected length where the first ring engages around the outer surface of the inner tube, said screw threads on the first ring and the inner tube being complementary.

10. The heater assembly of claim 3 in which the inner surface of the second ring has screw threads and the outer surface of the inner tube has screw threads on said second selected length where the second ring engages around the outer surface of the inner tube, said screw threads on the second ring and the inner tube being complementary.

11. A heater assembly for mounting around a fluid flow channel in an injection molding apparatus, the heater assembly comprising:
 a tube comprising a heat conductive material, the tube having a selected longitudinal length, an inner surface, and an outer surface;
 a ring having an inner surface engaged around the outer surface of the tube along a short selected length of the longitudinal length of the tube, the ring being made from a shape memory alloy that causes the ring to reduce in diameter when the ring is heated above a threshold temperature so as to positively clamp the inner tube on a portion of said injection molding apparatus forming said fluid flow channel during use of the heater assembly; and
 a heater mechanism capable of heating the tube to a selected elevated temperature.

12. A heater assembly according to claim 11 further comprising an outer tube receiving and mounted around the outer surface of the first mentioned tube, said ring mounting the outer tube in a fixed position around the outer surface of the first mentioned tube, the outer tube being mounted such that an inner surface of the outer tube is spaced a distance from the outer surface of the first mentioned tube.

13. A heater assembly according to claim 12 wherein the heater mechanism is mounted within the space between the first mentioned tube and the outer tube.

14. A heater assembly according to claim 13 further comprising a second ring having an inner surface engaged around the outer surface of the first mentioned tube along a second short selected length of the longitudinal length of the first mentioned tube, the second ring being made from a shape memory alloy that causes the second ring to reduce in diameter when the second ring is heated to positively clamp the first mentioned tube on a portion of said injection molding apparatus forming said fluid flow channel during use of the heater assembly.

15. A heater assembly according to claim 14 wherein the second ring mounts said outer tube in the fixed position around the outer surface of the first mentioned tube in cooperation with the first mentioned ring.

16. A heater assembly according to claim 13 wherein the short selected length extends from a first terminal end of the first mentioned tube, the ring being mounted at and around said first terminal end of the first mentioned tube.

17. A heater assembly according to claim 14 wherein the first mentioned ring and the second ring are made from the same shape memory alloy.

18. The heater assembly according to claim 1 wherein the heater mechanism engages the outer surface of the inner tube.

* * * * *